No. 756,959. PATENTED APR 12, 1904.
C. W. HERMAN.
GAGE TABLE AND CONVEYER.
APPLICATION FILED JAN. 7, 1904.
NO MODEL. 3 SHEETS—SHEET 1.

WITNESSES:
Joseph J. Hosler
J. R. Bond.

INVENTOR
Charles W. Herman
BY J. W. Bond
ATTORNEY

No. 756,959. PATENTED APR. 12, 1904.
C. W. HERMAN.
GAGE TABLE AND CONVEYER.
APPLICATION FILED JAN. 7, 1904.
NO MODEL. 3 SHEETS—SHEET 2.

WITNESSES:
Joseph J. Hosler
J. R. Bond

INVENTOR
Charles W. Herman
BY F. W. Bond
ATTORNEY

No. 756,959. PATENTED APR. 12, 1904.
C. W. HERMAN.
GAGE TABLE AND CONVEYER.
APPLICATION FILED JAN. 7, 1904.
NO MODEL. 3 SHEETS—SHEET 3.

WITNESSES:
Joseph J. Hosler
J. R. Bond

INVENTOR
Charles W. Herman
BY F. W. Bond
ATTORNEY

No. 756,959.

Patented April 12, 1904.

UNITED STATES PATENT OFFICE.

CHARLES W. HERMAN, OF CANTON, OHIO, ASSIGNOR OF ONE-HALF TO ALBERT T. BOWMAN, OF CANTON, OHIO.

GAGE-TABLE AND CONVEYER.

SPECIFICATION forming part of Letters Patent No. 756,959, dated April 12, 1904.

Application filed January 7, 1904. Serial No. 188,003. (No model.)

*To all whom it may concern:*

Be it known that I, CHARLES W. HERMAN, a citizen of the United States, residing at Canton, in the county of Stark and State of Ohio, have invented certain new and useful Improvements in Gage-Tables and Conveyers; and I do hereby declare that the following is a full, clear, and exact description of the same, reference being had to the annexed drawings, making a part of this specification, and to the figures of reference marked thereon.

The object of the present invention is to provide a gage-table and conveyer designed and calculated to manipulate heavy beams or bars with reference to a punching-machine and to move heavy beams of any desired length and to stop the movement of the beams at any predetermined point with reference to the punch-base and its mechanism.

Figure 1:
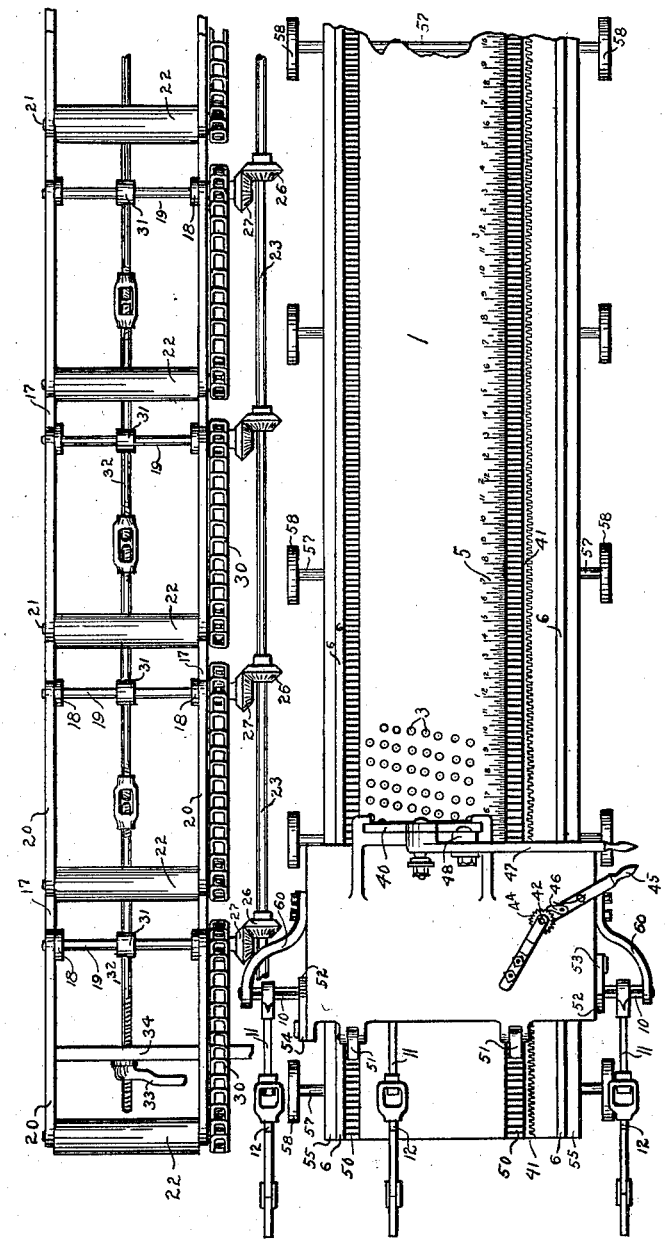
Figure 2:
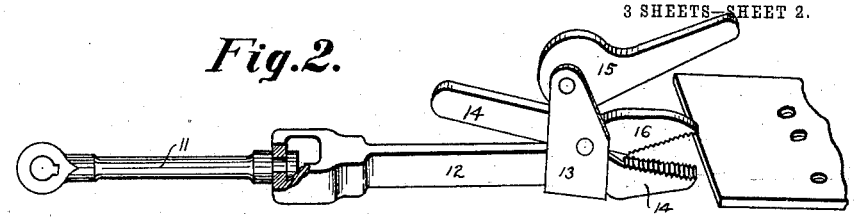
Figure 3:
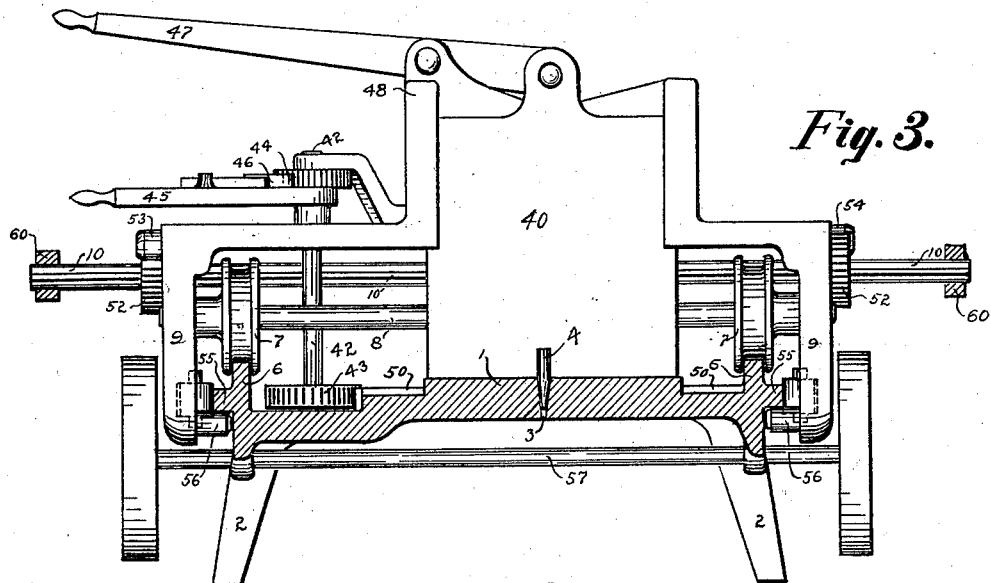
Figure 4:
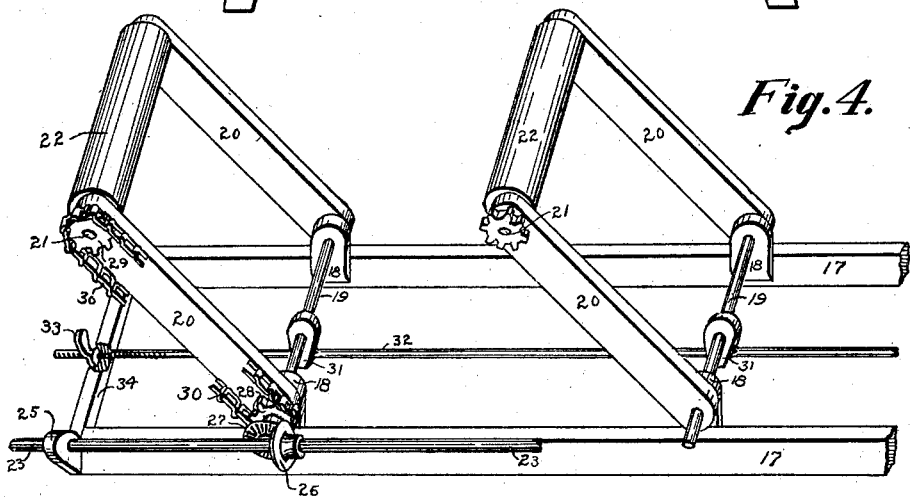
Figure 5:
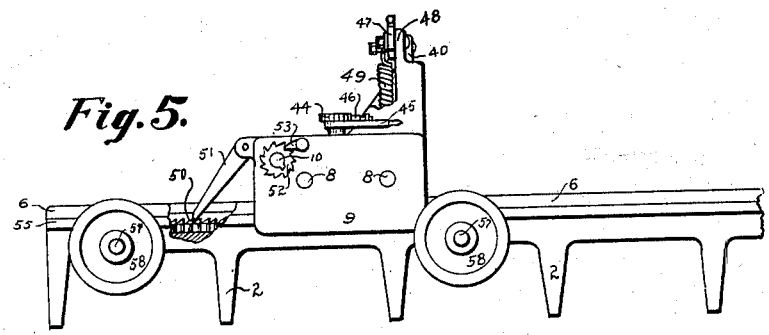
Figure 7:
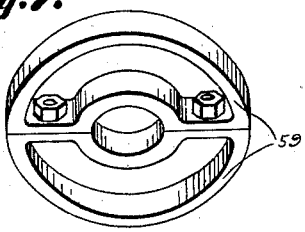
Figure 6:
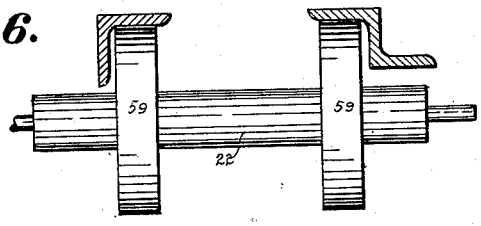
Figure 9:
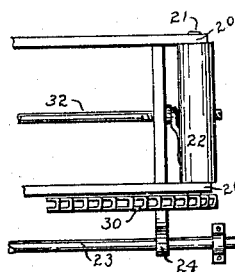
Figure 8:
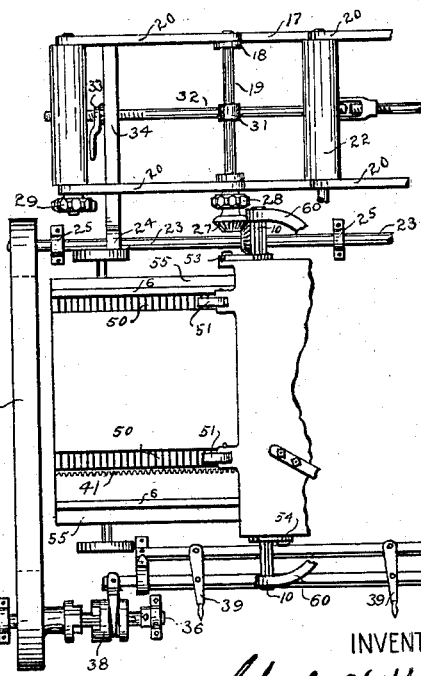

Figure 1 is a top view showing a portion of the gage-table and the beam or bar conveyer, showing the parts properly arranged with reference to each other. Fig. 2 is a detached view of one of the beam or bar clamping dogs. Fig. 3 is a transverse section of the table, showing the gage-head properly located thereon, showing one of the gage-pins in proper location. Fig. 4 is a perspective view showing a portion of the beam or bar conveyer rollers in proper relative position. Fig. 5 is a side elevation showing a portion of the gage-table, showing the gage-head located thereon. Fig. 6 is a view showing one of the beam or bar conveying rolls, showing removable conveying-wheels attached thereto and illustrating their application for conveying different-shape beams or bars. Fig 7 is a detached view of one of the detachable conveyer-wheels. Fig. 8 is a top view showing a portion of the gage-table and the clutch mechanism designed to throw the conveyer-rolls in and out of gear. Fig. 9 is a view showing a punch-base in proper relation to the beam or bar conveyers.

Similar numerals of reference indicate corresponding parts in all the figures of the drawings.

In the accompanying drawings, 1 represents the gage-table, which is supported at the required height by means of suitable legs 2 or their equivalents.

The gage-table 1 is provided with a series of apertures 3, which are so arranged that a pin, such as 4, (shown in Fig. 3,) can be set so as to stop the advance of the gage-head proper at any desired point, and for the purpose of measuring the advance of the gage-head a scale 5 is provided upon the table and the scale divided into inches or any fractional part thereof and the pin-holes 3 so arranged that pins can be placed to stop the gage-head proper at any predetermined point within the limit of the gage-head.

It will be understood that the table 1 is to be formed of a considerable length, owing to the fact that the material designed to be operated upon is beams or bars used in bridge-work or structural steel for buildings, and the gage-table should be of a length to correspond substantially with the length of the bars or beams designed to be operated upon regardless of the length, and hence the table should be about as long as the longest beam or bar designed to be operated upon or punched.

The table 1 is provided with the track or way 6, upon which track or way are mounted the gage-head-traveling wheels 7, which gage-head-traveling wheels are mounted upon shafts 8 or their equivalents, which are carried by the side members 9 of the gage-head. To the side members 9 of the gage-head proper is connected the shaft 10, to which shaft are attached the links 11, and to the links 11 are swiveled the bars 12, to which bars are attached the heads 13, and to the heads 13 are pivoted the jaws 14, which jaws are closed by means of the cams 15.

The object and purpose of providing the jaws 14 and the extended jaws 16 is to provide a means for securely connecting the beam designed to be punched to the gage-head proper, so that there will be no relative movement between the bar designed to be punched and the gage-head, or, in other words, to provide a means for causing the gage-head and the beam or bar to travel in exact unison.

The object and purpose of providing the swivel connection between the links 11 and the bars 12 is to allow the jaws 14 and 16 to be turned so that they can grip beams of various shapes, such as I-beams, Z-beams, channel-bars, or L-shaped bars, or any other bars designed to be punched.

To one side of the table 1 is located the conveyer proper, which conveyer consists of the parallel bars 17, to which parallel bars are securely fixed the short posts 18, which short posts are for the purpose of supporting the shafts 19, and to the shafts 19 are securely connected the roller-carrying arms 20, and to the upper ends of the roller-carrying arms 20 are journaled the roller-shafts 21, and upon the roller-shafts 21 are mounted the rollers 22, which rollers are for the purpose of carrying and moving the various beams or bars designed to be punched or operated upon.

To one side of the parallel bars 17 is located the shaft 23, which shaft 23 is journaled in suitable bearings 24 and 25. Upon the shaft 23 are securely mounted the beveled gear-wheels 26, which beveled gear-wheels mesh with the beveled gear-wheels 27, said beveled gear-wheels being formed integral or connected to the sprocket-wheels 28, and said wheels 27 and 28 are loosely mounted upon the shafts 19 and independent thereof. Upon the shaft 21 are securely mounted the sprocket-wheels 29, which sprocket-wheels, together with the shafts 21 and the rollers 22, will rotate by means of the drive-chains 30. To the shafts 19 are securely attached the downward-extending arms 31, to which downward-extending arms is connected the rod 32, which rod is screw-threaded at one end and is provided with the screw-threaded nut 33, which screw-threaded nut is located against the face of the bar 34 or its equivalents.

It will be understood that by rotating the screw-threaded nut 33 the rod 32 will be moved lengthwise, and when moved to the left, as illustrated in Fig. 4, the roller-carrying arms 20 will be elevated, it being understood that the rod 32 should be so connected to the arms 31 that the arms can describe the arc of a circle in their movements.

The purpose of the rod 32 and the nut 33 is to provide a means for elevating and lowering the rollers 22, so as to bring them into different horizontal planes and to adjust them so that they will carry the beams or bars designed to be operated upon at the required height or elevation.

It will be understood that a beam or bar conveying device similar to the one described should be located upon the opposite side of the punch-base 35; but inasmuch as said conveyer is a duplication of the one just above described no description is deemed necessary.

For the purpose of conveying power to move the beams designed to be punched a countershaft 36 is provided, which counter-shaft is provided with suitable pulleys to rotate the shaft 23 by means of the belt 37 or its equivalents, and for the purpose of throwing the shaft 23 in and out of action a clutch, such as 38, is provided, which clutch may be of any desired form or kind.

In the drawings I have illustrated an interlacing clutch; but I do not desire to be confined to any particular kind of clutch mechanism.

For the purpose of throwing the clutch in and out of action a series of levers 39 are provided, which levers are properly connected so that they will operate the clutch and should be located at intervals along the table 1, so as to be conveniently reached by an operator, as it will be understood that the operator must necessarily travel from one end of the table to the other in case a beam of a length corresponding with the length of the table is to be operated upon.

When it is desired to move a beam or bar so as to bring it in proper position with reference to the punch-base 35, one of the levers 39 is moved so as to throw the clutch 38 into operative position, at which time rotary motion is communicated to the rollers 22 and the beam moved lengthwise.

It is well understood that it is necessary to punch structural beams accurately, and in order to accomplish this result the beams must be connected to the gage-head proper, which travels along the table as the beam is moved by means of the rollers 22, and in order that the beam may be stopped at a predetermined point a pin, such as 4, is placed in the proper aperture or pin-hole 3, and as the gage-head moves along upon the table the sliding head 40 comes in contact with the proper pin 4.

It will be understood that when power is applied to move the beam as the sliding head approaches the pin 4 the power must be cut off, and if in the event the sliding head 40 does not come in contact with the pin 4 the gage-head must be moved forward, so as to bring the beam in proper position, and in order to accomplish this the table 1 is provided with the rack-bar 41 and the gage-head provided with the vertical shaft 42. Upon the bottom or lower end of the vertical shaft is located the pinion 43, which pinion meshes with the rack-bar 41.

The top or upper end of the vertical shaft 42 is provided with the ratchet-pinion 44, which ratchet-pinion is operated by means of the lever 45 and the dog or detent 46.

It will be understood that as the pinion 43 is rotated the gage-head will be moved along the table 1, and when moved the beam or bar will be carried with said gage-head, said beam riding upon the rollers 22, by which arrangement the beam can be stopped at a point where the sliding head 40 comes in contact with the proper pin 4.

For the purpose of preventing any variation as to the relative movement of the gage-head upon the table 1 the pins 4 are tapered at their lower ends and the apertures 3 also tapered, so that the pins remain in the same position regardless the amount of wear, as it will be understood that as the aperture 3 and the pins 4 wear the tapered portion will be seated farther into the apertures, but the upper portions of the pin will remain in the same position.

For the purpose of moving the sliding head 40 upward, so as to clear any pins that may be desired to have the head pass, a lever 47 is provided, which lever is pivoted to one of the uprights 48 and the inner end of the lever 47 pivoted to the top of the sliding head 40.

For the purpose of holding the head 40 down upon the face of the table at all times, except when it is desired to have the same elevated, a spring, such as 49, is provided, which spring is connected at its upper end to the bolt connecting the lever 47 and the head 40 together.

It will be understood that there should be no backward movement of the gage-head, and in order to prevent any backward movement the table 1 is provided with the tooth-bars 50, which tooth-bars are located substantially as shown in the drawings.

To the gage-head are pivotally attached the detents 51, which detents engage the teeth of the tooth-bars 50 and prevent any backward movement.

It will be understood that as the gage-head is moved forward the detents 51 will ride over the teeth. It will also be understood that in order to prevent any swinging movement of the links 11 the shaft 10 should be held against rotation in either direction, and in order to accomplish this result ratchet-wheels 52 are securely mounted upon the shaft 10 and dogs or detents 53 and 54 provided, which dogs or detents are pivoted upon opposite sides of the ratchet-wheels 52.

For the purpose of holding the gage-head down upon the table at all times and under all circumstances as it is moved along said table the flanges 55 are provided and the rollers 56 located upon the under side of the flanges 55, said rollers being mounted upon suitable studs, which studs are fixed to the side members 9 of the gage-head proper.

In order to properly hold beams of considerable width and prevent the same from tilting, the frame of the table 1 is provided with any desired number of shafts 57, upon which shafts are mounted the rollers or wheels 58, which rollers or wheels act as carriers for the beams.

For the purpose of providing means of moving beams of various shapes the rollers 22 are provided with the divided wheels 59, which divided wheels are so constructed that they can be easily removed from the rollers 22 and attached when desired.

For the purpose of properly bracing the shaft 10 at its ends and preventing any springing of the shaft by reason of any strain that may come upon the grip-jaws 15 and 16 and their different parts the braces 60 are provided, which braces are connected to the outer ends of the shaft 10 and to the gage-head proper.

The beams designed to be moved rest upon the rollers carried by the arms 20, and as the rollers 22 are rotated they will move the beams resting thereon, and owing to the fact that the beam is operatively connected with the gage-head, that moves back and forth upon the table, said gage-head will be stopped at the proper point with reference to the point where the beam carried by the conveyers is to be operated upon.

Having fully described my invention, what I claim as new, and desire to secure by Letters Patent, is—

1. In a gage-table and conveyer, the combination of a table having a series of pin-apertures, pins adapted to be located in the apertures, a scale upon the face of the table, a gage-head movable along the table and said gage-head provided with grip-jaws and a conveyer located parallel with the table, substantially as and for the purpose specified.

2. The combination of a table provided with a series of pin-apertures, pins adapted to be located in the apertures, a gage-head movable upon the table, and said gage-head provided with a sliding head adapted to engage a pin located in an aperture of the table and beam-conveying mechanism, substantially as and for the purpose specified.

3. The combination of a table provided with pin-apertures, pins adapted to be secured in the apertures, a gage-head movable upon the table and the table provided with a rack-bar, a shaft journaled in the gage-head, said shaft provided with a pinion meshing with the rack-bar and a ratchet-wheel secured to the upper end of the shaft, and the lever and detent adapted to operate the pinion and move the carriage, and a bar-conveyer located parallel with the table, substantially as and for the purpose specified.

4. In a gage-table and conveyer a table having mounted thereon a traveling gage-head, a sliding head carried by the gage-head, pins located in apertures, a conveyer located parallel with the gage-table, said conveyer having rollers adapted to carry the beam, and means for elevating and lowering the rollers, substantially as and for the purpose specified.

5. The combination of a series of roller-arms fixed to shafts, said roller-arms provided with rollers at their free ends, arms fixed to the shafts to which the roller-arms are attached, sprocket and beveled wheels loosely mounted upon said shafts, sprocket-wheels fixed to the shafts of the rollers and drive-chains, a shaft provided with beveled gear-wheels meshing with the beveled gear-wheels mounted upon shafts to which the roller-arms are attached and a rod connected to the arms and means for imparting lengthwise movement to the rod, substantially as and for the purpose specified.

In testimony that I claim the above I have hereunto subscribed my name in the presence of two witnesses.

CHARLES W. HERMAN.

Witnesses:
    JOHN H. SPOUSELLER,
    F. W. BOND.